United States Patent
Laufmann et al.

(10) Patent No.: US 6,192,218 B1
(45) Date of Patent: *Feb. 20, 2001

(54) METHOD AND SYSTEM FOR IDENTIFYING AND TRANSMITTING CALLING PARTY INFORMATION AS PART OF A PAGING SIGNAL

(75) Inventors: Steven C. Laufmann, Louisville; William J. McIver, Jr., Lafayette, both of CO (US)

(73) Assignee: Qwest Communications International Inc., Denver, CO (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/941,118

(22) Filed: Sep. 30, 1997

(51) Int. Cl.[7] ............................... H04M 3/42; G08B 5/22
(52) U.S. Cl. .................... 455/31.2; 455/415; 340/825.44
(58) Field of Search ................................. 455/415, 414, 455/412, 31.1, 31.2, 32.1, 458, 459, 466; 340/825.44, 311.1; 379/142

(56) References Cited

U.S. PATENT DOCUMENTS

| | | | |
|---|---|---|---|
| 4,680,785 | * 7/1987 | Akiyama et al. | 379/142 |
| 4,924,496 | * 5/1990 | Figa et al. | 379/142 |
| 4,994,797 | * 2/1991 | Breeden | 455/415 |
| 5,224,150 | * 6/1993 | Neustein | 455/31.2 |
| 5,317,621 | * 5/1994 | Shibayama | 455/31.2 |
| 5,394,140 | * 2/1995 | Wong et al. | 340/825.44 |
| 5,487,100 | * 1/1996 | Kane | 455/31.2 |
| 5,502,761 | * 3/1996 | Duncan et al. | 455/412 |
| 5,574,439 | * 11/1996 | Miyashita | 340/825.44 |
| 5,604,492 | * 2/1997 | Abdul-Halim | 455/32.1 |
| 5,703,934 | * 12/1997 | Zicker et al. | 379/142 |
| 5,894,506 | * 4/1999 | Pinter | 379/88.23 |
| 5,936,547 | * 8/1999 | Lund | 340/825.44 |
| 5,966,663 | * 10/1999 | Gleason | 455/466 |

* cited by examiner

Primary Examiner—Dwayne D. Bost
Assistant Examiner—Erika A. Gary
(74) Attorney, Agent, or Firm—Brooks & Kushman P.C.

(57) ABSTRACT

A method of identifying and transmitting predetermined calling party information as part of a messaging signal is provided for use in a communications network having a messaging processor serving at least one messaging device. At least one database is provided in communication with the messaging processor. The database includes a list of calling party telephone numbers and corresponding calling party names. A message request signal is received at the messaging processor and includes a data field including a message generated by a calling party. The message is parsed to extract possible calling party telephone numbers which are thereafter compared to a stored list of calling party telephone numbers to identify the name of the calling party. A messaging signal is then generated for receipt by the messaging device. The messaging signal includes a data field for identifying the calling party name.

3 Claims, 4 Drawing Sheets

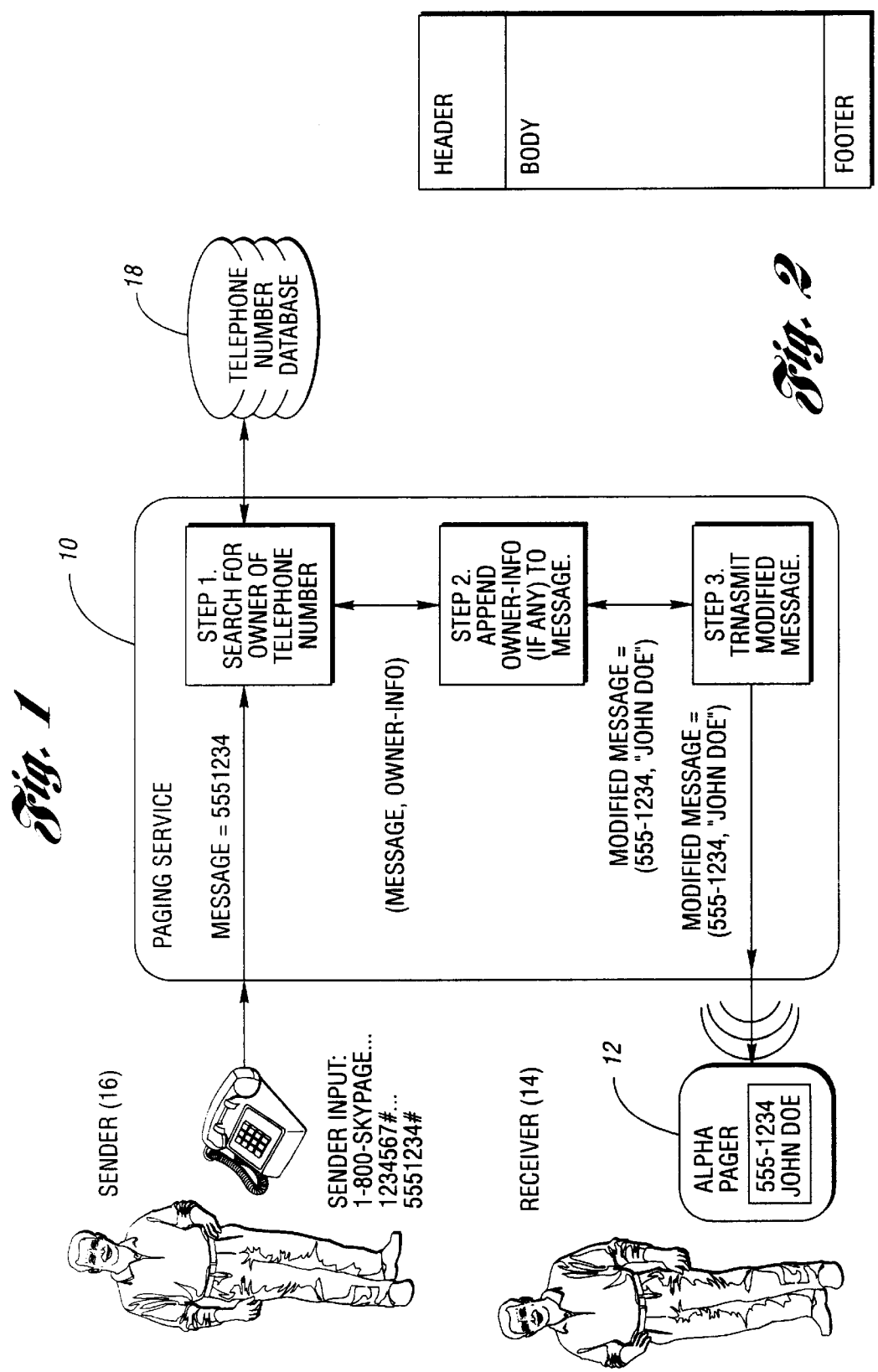

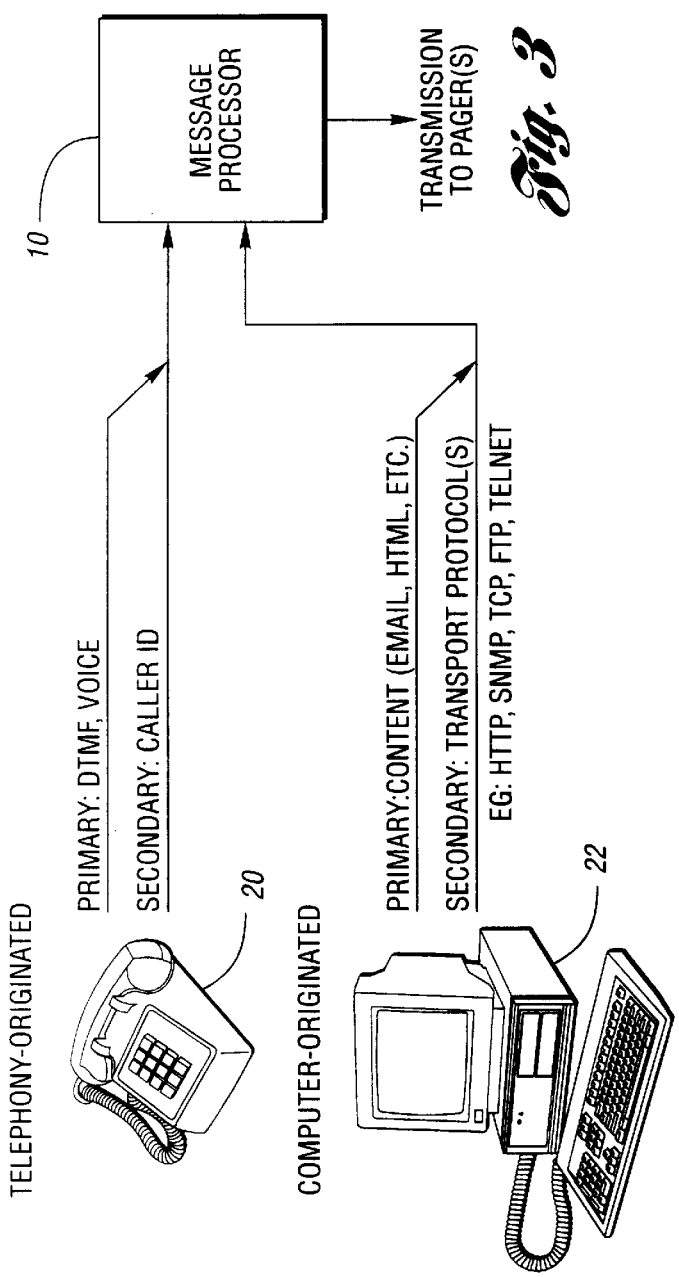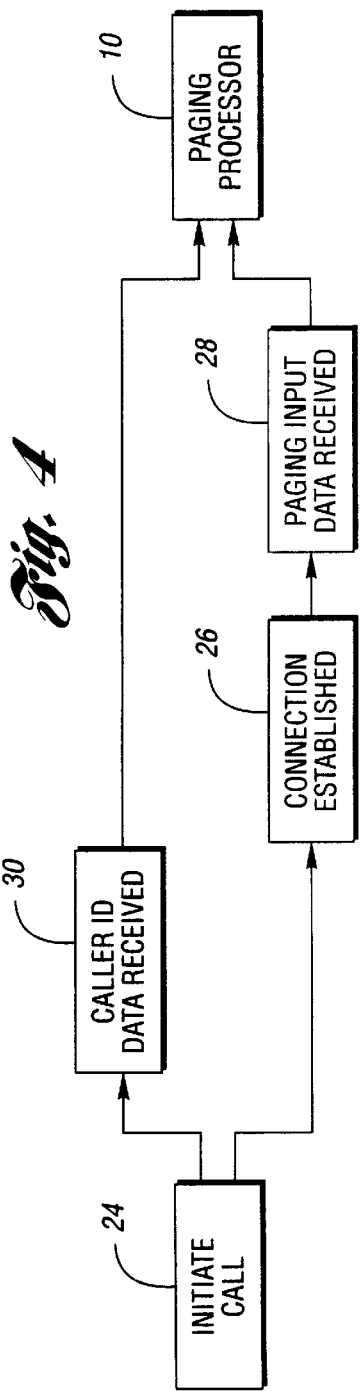

METHOD AND SYSTEM FOR IDENTIFYING AND TRANSMITTING CALLING PARTY INFORMATION AS PART OF A PAGING SIGNAL

TECHNICAL FIELD

This invention relates to a method and system for identifying and transmitting customer identification information as part of a messaging signal.

BACKGROUND ART

Most messaging systems require a user to send a message by transmitting a message signal which includes a numeric or alpha-numeric message for receipt and display on a called party's personal communication system device. In most cases, including E-mail, voice-mail, etc., limited information is provided to the called party regarding the source of the message. Typical paging systems, for example, require a user to send a page by dialing a telephone number and inputting a numeric message via the telephone keypad, whereupon the numeric message is transmitted to the designated paging device and displayed on the device's display. Presumably, the numeric message is a telephone number for the recipient to call. No information is provided regarding the identity of the user or, for that matter, the identity of the person or business associated with the displayed telephone number. The current generation of one-way paging devices contain a liquid crystal display (LCD) which allows the user of the device to receive and display short alpha-numeric messages.

Paging services offer several methods of sending messages to the pagers of their subscribers. Such methods of sending messages include telephone keypad input, E-mail, or through dictation to a paging service operator. The predominant method used to input a numeric message is via a telephone keypad. Using this method, a caller sends a message to a paging device by dialing its telephone number, waiting for a prompt, and inputting a numeric message via the telephone keypad. As a result, the numeric message is transmitted to the designated paging device and displayed on the device's LCD. Note that for some paging services, the number dialed designates the paging device, while for others additional input on the telephone keypad is required to identify the paging device. Presumably, the numeric message is a telephone number for the recipient to call.

As noted above, it is possible, however, that the recipient of the numeric message may not be able to associate the telephone number sent to him with an owner. Under this circumstance, the recipient may refuse to respond to a page because he cannot identify the telephone number. Alternatively, the recipient may respond to the page and be exposed to fraudulent telephone charges or violations of privacy.

According to studies, in 1995 there were more than 50 million pagers in use worldwide, with over 25 million of those in North America. The user base worldwide is expected to grow to over 130 million by the year 2000.

Consequently, a need has developed for an identification service for the users of messaging systems including, but not limited to, alpha-numeric paging devices. This service should attempt to identify the source of the message input by the sender and append this information to the message before it is sent to the subscriber's personal communication system device. This will allow the subscriber/recipient to better judge the validity of the message and act accordingly.

DISCLOSURE OF THE INVENTION

It is a principal object of the present invention to provide a method and system for receiving primary and secondary sources of information in a message and annotating the message.

It is a further object of the present invention to provide a method and system for identifying and transmitting calling party information as part of a messaging signal such as, for example, a paging signal.

It is a further object of the present invention to provide a method and system of identifying and transmitting calling party information as part of a messaging signal, wherein the calling party information is part of a stored profile for each calling party.

Yet still further, it is an object of the present invention to provide a method and system of identifying specific messaging requests which are to be transmitted or, alternatively, undesired messaging requests for which a warning is transmitted as part of a messaging signal or the message is blocked.

In accordance with the invention, there is provided a method of identifying and transmitting predetermined calling party information as part of a messaging signal. The method is specifically directed for use in a communications network, such as, for example, a paging service having a messaging processor serving at least one messaging device. As part of the method, at least one database is provided in communication with the messaging processor. The database includes a stored list of calling party information and corresponding calling party names. In a preferred embodiment, the calling party information comprises calling party telephone numbers. It is anticipated, however, that any other suitable numeric or alphanumeric information may be stored.

In keeping with the invention, the method further includes receiving at the messaging processor a message request signal having a data field including a message generated by a calling party. The message is thereafter parsed to extract possible calling party information. Again, in a preferred embodiment, the calling party information sought to be extracted is a possible calling party telephone number. Thereafter, the extracted calling party information, typically, but not necessarily, the calling party telephone number, is compared to the stored list of calling party information to identify the name of the calling party. A paging signal is then generated for receipt by at the least one messaging device. The messaging signal has a data field including the determined calling party name.

In a preferred embodiment, the communications network is further provided in communication with the Public Switched Telephone Network (PSTN), the Internet, or private Internet. The message generated by the calling party, typically a telephone number, may be generated by Automatic Number Identification (ANI) service equipment. As indicated above, the message generated by the calling party may be a numeric message, i.e., a telephone number. Alternatively, the message may be in voice or text format. In keeping with the invention, the page request signal may also be generated by a calling party via a Dual Tone Multi-Frequency (DTMF) telephone keypad or any other suitable means, such as, for example, an E-mail message to an Internet gateway.

In an alternative embodiment, the at least one database provided as part of the present invention may include a profile stored for each calling party. The profile will include the calling party's telephone number, a list of predetermined messages, and corresponding calling party information. As such, each calling party will have its own stored set of predetermined messages and assigned calling party information which can be identified and included as part of a data field in the ultimate messaging signal generated for receipt by the messaging device.

In carrying out the above method, there is further provided a system for identifying and transmitting predetermined calling party information as part of a messaging signal. As in the above-described method, the system is specifically directed for use in a communications network having a messaging processor serving at least one messaging device. The system includes at least one database in communication with the paging processor. The database includes a list of predetermined calling party messages and corresponding calling party names. As in the above-described method, the list of predetermined messages typically, but not necessarily, comprises calling party telephone numbers. The system further comprises receiving means in communication with the messaging processor operative to receive a message request signal having a data field including a message generated by a calling party. Parsing means are further provided in communication with the messaging processor to extract possible calling party telephone numbers. Still further, comparing means is provided in communication with the messaging processor to compare the extracted telephone numbers to the stored list of calling party telephone numbers so as to identify the name of the calling party. Finally, signal generating means are provided in communication with the processor for generating a messaging signal for receipt by the at least one messaging device. The messaging signal has a data field including the calling party name.

Again, in an alternative embodiment, the at least one database of the above-described system includes a profile for each calling party. The profile includes the calling party's telephone number, a list of additional predetermined messages and corresponding calling party information, such as, for example, the calling party name.

These and other objects, features, and advantages of the present invention are more readily apparent from the following detailed description of the best modes for carrying out the invention when taken in connection with the accompanying drawings wherein like reference numerals correspond to like components.

BRIEF DESCRIPTION OF THE DRAWINGS

FIG. 1 is a schematic illustrating the identification process of the present invention as applied to a paging system;

FIG. 2 illustrates a typical computer-based E-mail or other computer protocol;

FIG. 3 depicts the high-level data flow of the present invention;

FIG. 4 shows a more specific breakdown of primary and secondary data streams in telephony-originated pages;

BEST MODE FOR CARRYING OUT THE INVENTION

Figure 5:
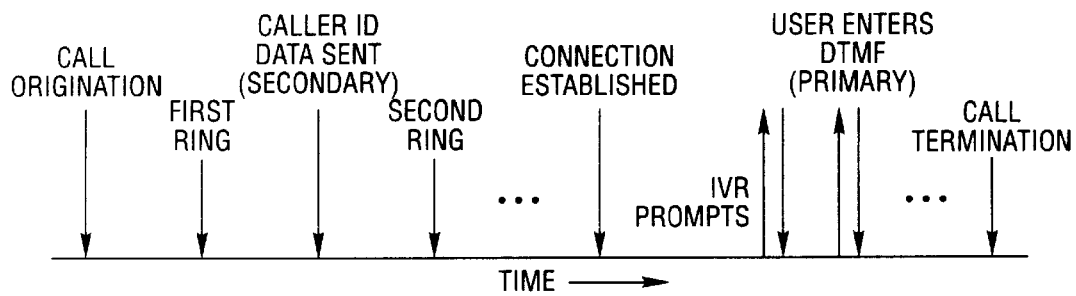
FIG. 5 is a timing diagram indicating the receipt of primary and secondary data streams in telephony-originated DTMF pages.

With reference to FIG. 1 of the drawings, there is shown a schematic illustrating the basic identification process of the present invention as applied to a paging system. It is to be understood, however, that the invention discussed herein is applicable to all messaging systems, including, but not limited to, E-mail, voice-mail, and Web-based systems. Regardless of the application, the invention focuses on reviewing primary and secondary sources of information in a message and annotating the message. As those skilled in the art will recognize, "primary" sources of information include information within the message that is sent. For example, in a paging system, if an alpha-page is sent, there is a piece of text that is sent to the pager service. This text, which comprises primary information, is in turn, sent to the paging device. "Secondary" sources of information, in contrast, comprises information that is obtained indirectly such as, for example, through the delivery infra-structure. This information is related to various facets of the message itself, but has nothing directly to do with the message being sent by the calling party. For example, in a traditional paging system where a calling party is originating a page from a DTMF telephone keypad, ANI information might be useful but nonetheless comprises "secondary" information. That is, it has nothing directly to do with the message, e.g., a telephone number to call, which is being sent. This information is merely supplied by the telephone infra-structure about the message. The same holds true for computer-originated messages such as E-mail. In such cases, the E-mail message will come with a header as well as possibly a footer. See FIG. 2 of the drawings. These portions contain indirect information relevant to the message, such as date, time stamp, recipients, etc., but are not the message itself. As discussed herein, for purposes of the invention, this "secondary" information is useful.

The identification process contemplated by the present invention is a seamless service intended to be transparent to the calling party/message sender. In general, the service will allow callers to send messages to a messaging service such as a pager using a telephone keypad, computer terminal or other suitable input device. The service, in turn, in addition to its normal functionality, will perform the additional steps of dissecting the message to identify one or more predetermined messages stored in a database, associate the message with corresponding calling party information, append the results of the search, including failed identifications, to the original message, and transmit the message, in the usual manner, to the device to which the message was directed.

In a preferred embodiment for a paging system, the initial message generated by a calling party may be a telephone number which the calling party desires the paged party to call. A suitable database will be maintained of calling party telephone numbers and corresponding calling party names. A telephone number generated by the calling party is, therefore, searched against the database to locate possible matches. It is contemplated, however, that other messages may be generated by the calling party and that the predetermined messages and assigned calling party information stored in the database may comprise information other than a listing of calling party telephone numbers and corresponding names. For example, the message generated may be a numeric or alphanumeric message which includes or incorporates the message "A5123". The database might contain this predetermined message and have assigned thereto a specific meaning such as, for example, "call home".

If the predetermined message "A5123" is maintained as part of a generalized database, any calling party which generated a message including or incorporating this message would cause the calling party information "call home" to be sent to the paged party. Alternatively, a profile may be maintained for each calling party classified by, for example, an identification number or calling party telephone number.

In such a case, each calling party might have a separate profile maintained in a suitable database. Thus, the message "A5123" could mean "call home" when generated by one calling party, yet have no meaning or a different meaning when generated by a different calling party.

While it is recognized that the message generated by the calling party and the stored list of predetermined messages may comprise messages other than telephone numbers, and the stored list of corresponding calling party information may comprise information other than calling party names, these designations will be used herein as a means to better explain Applicants' invention.

Referring still to FIG. 1 of the drawings, the basic identification process of the present invention will be further described with reference to a paging system. As shown, the method and system is specifically intended for use in a communications network having a paging processor 10 serving at least one paging device 12 operable by a paged party 14. In operation, a calling party 16 generates a page request signal via a Dual Tone Multi-Frequency (DTMF) keypad or other suitable input device such as, for example, a computer terminal or the like. The page request signal has a data field including a message generated by a calling party. Here, the message corresponds to a telephone number and is shown as 555-1234.

As part of the invention, at least one database 18 is provided in communication with the paging processor 10. Database 18 includes a stored list of predetermined calling party messages and corresponding calling party information. Again, in the preferred embodiment, the predetermined calling party messages comprise telephone numbers of the calling parties. Likewise, the calling party information comprises the corresponding calling party names.

Following receipt of the page request signal, the message generated by the calling party is parsed to extract possible calling party telephone numbers. While the message is shown as a telephone number 555-1234, it is contemplated that any suitable voice or text message may be sent which includes or incorporates the referenced telephone number 555-1234. The extracted calling party telephone numbers are thereafter compared to the stored list of telephone numbers in the database to identify the name of the calling party. Thereafter, the message is appended to include the calling party name and a corresponding paging signal is generated for receipt by the paging device 12.

As shown, for example, in FIG. 2 of the drawings, a typical computer-generated paging message may include a body portion wherein the message generated by the calling party, i.e., the telephone number, is typically placed as a primary data stream. The page request signal further includes one or more headers or footers wherein secondary data streams, such as, for example, the identified calling party name or other suitable calling party information, may be placed following identification.

In keeping with the invention, Applicants contemplate four generalized types of message-based pager ID service: telephone-originated numeric messaging, voice messaging with pager notification, operator-assisted text messaging, and computer-originated messaging such as electronic mail-originated messaging and Web-based originated messaging, i.e., via Internet access. The first class of service is described generally above with reference to FIG. 1 of the drawings. As disclosed, senders initiate messages by calling a telephone number, possibly inputting a pager identification number for the receiving paging device, and inputting a numeric message such as, for example, a telephone number via a telephone keypad, and more specifically, a DTMF keypad. Thereafter, an attempt is made to associate the numeric message with an owner, i.e., the name of a calling party, using one or more database look-ups. Results of this attempt are appended to the original message, which is then transmitted to the paging device.

In an alternative embodiment, a sender may initiate messages by calling a telephone, possibly inputting a pager identification number of the receiving paging device, and leaving a voice message. Thereafter, voice recognition technology may be used to attempt to extract possible telephone numbers from the voice message. An attempt may then be made to associate extracted numbers with owners, i.e., calling party names, using one or more database look-ups. The results of this attempt are thereafter appended to the original voice message, which may then be left for the recipient to hear upon retrieval. Notification of the voice message may be transmitted to the paging device in the usual manner.

In operated-assisted text messaging, a sender may initiate messages by calling a paging service operator, dictating a message and specifying a recipient. The paging service operator may be real or cybernetic. The text message created by the operator may then be parsed for possible telephone numbers. An attempt may then be made to associate the extracted numbers with owners using one or more database lookups. Finally, results of this attempt may be appended to the message originally created by the operator, which is then transmitted to the paging device specified by the sender.

In computer-originated messaging such as, for example, electronic mail-originated messaging, a sender may initiate a message by sending an E-mail message to a special Internet gateway provided by the paging service. Depending upon the paging service, the E-mail address or part of the content of the E-mail message may be used to specify the paging device to which the message is being sent. The E-mail message may then be parsed for possible telephone numbers or other identifying features such as addresses, names (including titles), Internet addresses, Internet Uniform Resource Locators (URL's), special symbols or phrases, such as those used to identify missing information in caller ID services, and custom features, such as those defined for use in a particular industry or organization. The schematic of FIG. 2 illustrates the breakdown of primary and secondary data streams in computer-originated messages. As shown, the primary data stream includes information in the message body. The secondary data stream includes information in message wrappers including all headers and footers and information regarding the origin, i.e., the source of the message.

An attempt is then made to associate extracted numbers with owners using one or more database look-ups. Again, results of this attempt are appended to the original E-mail message, which is then transmitted to the paging device. Assembly of the final message may be based on a number of constraints, or rules, which take into consideration factors such as, for example, the length of the message the recipient's pager can receive, i.e., pager capacity, annotation prioritization, sender preferences, recipient preferences, annotation abbreviations, codes, and/or special symbols. With regard to message length, those skilled in the art will recognize that it is possible to send a long message broken into multiple shorter pieces. Thus, the length of the primary message must be taken into consideration as must the number and length of primary and secondary annotations.

As an alternative embodiment, the invention further contemplates the use of Automatic Number Identification-based (ANI) pager identification services. Again, such ANI services may be telephone-originated, voice messaging with pager notification, and operator-assisted text messaging.

The above-described ANI-based services are concerned with identifying the owner of the telephone number from which the message is sent using ANI functionality. This information is then appended to the message transmitted to the paging device. For telephone-originated numeric messaging, a sender will initiate messages by calling a telephone number, possibly inputting a pager identification number, and inputting a numeric message via a telephone keypad. The paging service captures the ANI information for the call in addition to the numeric message and, if necessary, the pager identification number. This information is thereafter appended to the original message which is transmitted to the paging device.

As a further alternative embodiment, the invention contemplates the use of computer-generated messages such as, for example, electronic mail-originated messaging, Web-based originated messaging, or other suitable message originating system.

In voice messaging, a sender initiates messages by calling a telephone, possibly inputting a pager identification number, and leaving a voice message. The exemplary paging service described herein is operative to capture the ANI information for the call in addition to the voice message. If necessary, the pager identification number may also be captured. This information is then appended to the original voice message, which is then left for the recipient to hear upon retrieval. Notification of the voice message may then be transmitted to the paging device in the usual manner.

In operator-assisted text messaging, a sender initiates a message by calling a paging service operator, and dictating a message, specifying a recipient. Again, the paging service operator may be real or cybernetic. The paging service captures the ANI information for the call, appends it to the text message created by the operator, then transmits the same to the paging device.

Finally, electronic mail-originated messaging, Internet services and, in particular, Domain Name Services (DNS) may be used instead of ANI to obtain more identifying information about the Internet site from which a page is being sent. In operation, a sender may initiate a message by sending an E-mail message to a special Internet gateway provided by the paging service. Depending upon the paging service, the E-mail address or part of the content of the Email message may be used to specify the paging device to which the message is being sent. The E-mail message may then be parsed for information which can be used to determine the identity of the sender and his Internet site. Various Internet services and mechanisms may then be used to locate additional information about the sender. The resulting information may thereafter be appended to the original E-mail message which is transmitted to the paging device.

In addition to the foregoing, Applicants contemplate the use of various identification services which may be applied in an ancillary manner to any of the other services. One such service would warn the recipient of paging requests associated with undesired telephone numbers. Telephone numbers that are suspected of being transmitted for illegal purposes may be maintained in a special suspect number database, or perhaps especially annotated in existing telephone number databases. If a number is found within such a database or with a suspect number annotation during the searches performed as part of the other services, a warning message may be appended to the pager ID information. This service can be further specialized to provide warnings based on specific area codes or parts of a telephone number.

In addition to the foregoing, specific message requests may also be blocked. For example, with reference still to paging systems, paging device holders may specify to the paging service one or more numbers, E-mail addresses, or Internet domains from which they wish to block pages. Numbers, E-mail addresses, and Internet domains would be checked against this list, in addition to pager identification processes involved in the other services. If a number, E-mail address, or Internet domain is found on the list, the transmission of the message to the paging device will be cancelled. Optionally, the paging service may make available to paging device holders information about blocked pages. These services would be especially useful for paging device holders who are subject to fraudulent or erroneous pages from the same set of numbers.

Alternatively, paging device holders may specify to the paging service one or more numbers, E-mail addresses, or Internet domains which are approved to receive messages based on time of day, day of week, or any other suitable criteria. If a number, E-mail address, or Internet domain is not found on the approved list, the transmission of the message to the paging device will be cancelled. Whether the system utilizes a list of blocked numbers or a list of approved numbers, the paging service may optionally make available to the paging device holder information regarding blocked pages. Such services would be especially useful for paging device holders which are subject to fraudulent or erroneous pages from the same set of numbers.

Complementary to page blocking, page requests may be filtered. In other words, paging device holders may specify to the paging service one or more numbers, E-mail addresses, or Internet domains from which they wish to receive pages based on time of day, day of week, geographic area, or any other suitable criteria. Numbers, E-mail addresses and Internet domains may be checked against this list, in addition to pager identification processes involved in the other services. If a number, E-mail address, or Internet domain is found on the list, the transmission of the message to the paging device will be permitted. Otherwise, the message will be cancelled. Optionally, the paging service may also make available to paging device holders information about cancelled pages. This aspect of the invention would be especially useful for paging device holders who are charged by the amount of data sent to their paging device and wish to limit pages to a specific set of people. This service may be further specialized by requiring senders to input a predetermined identification number for authentication purposes. In this manner, filtering may be achieved independent of location, i.e., the ANI and/or erroneous input.

The above-described services may be better understood with reference to the high-level data flow diagram of FIG. 3. As shown, in telephony-originated messaging, primary data, such as, for example, numeric, text, or voice messages may be generated at customer premises equipment such as, for example, a telephone 20. In the case of numeric or text messages, the telephone 20 will preferably, but not necessarily, be equipped with a DTMF keypad. Secondary data such as, for example, caller ID will be generated by ANI equipment. The primary and secondary data streams will be received by the paging processor 10 which is operative to perform the necessary parsing, database look-up, and message appending functions.

Alternatively, primary data may be generated via a computer 22 or other suitable input device and may comprise, for example, E-mail, HTML or other text formats. Secondary data may comprise transport protocols such as, for example, HTTP, SNMP, TCP, FTP, telnet, etc. Again, these primary and secondary data streams are generated for receipt by messaging processor 10.

A more specific breakdown of primary and secondary data streams in telephony-originated pages may be better understood with reference to FIG. 4. As shown in block 24, the calling party initiates a call. Thereafter, a connection is established at block 26 and primary data, i.e., paging input data 28 is received by paging processor 10. In parallel, secondary data, i.e., information such as, for example, caller ID as shown in block 30, is also forwarded to paging processor 10. A timing diagram illustrating the receipt of primary and secondary data streams in telephony-originated DTMF pages is shown in FIG. 5.

Figure 6:
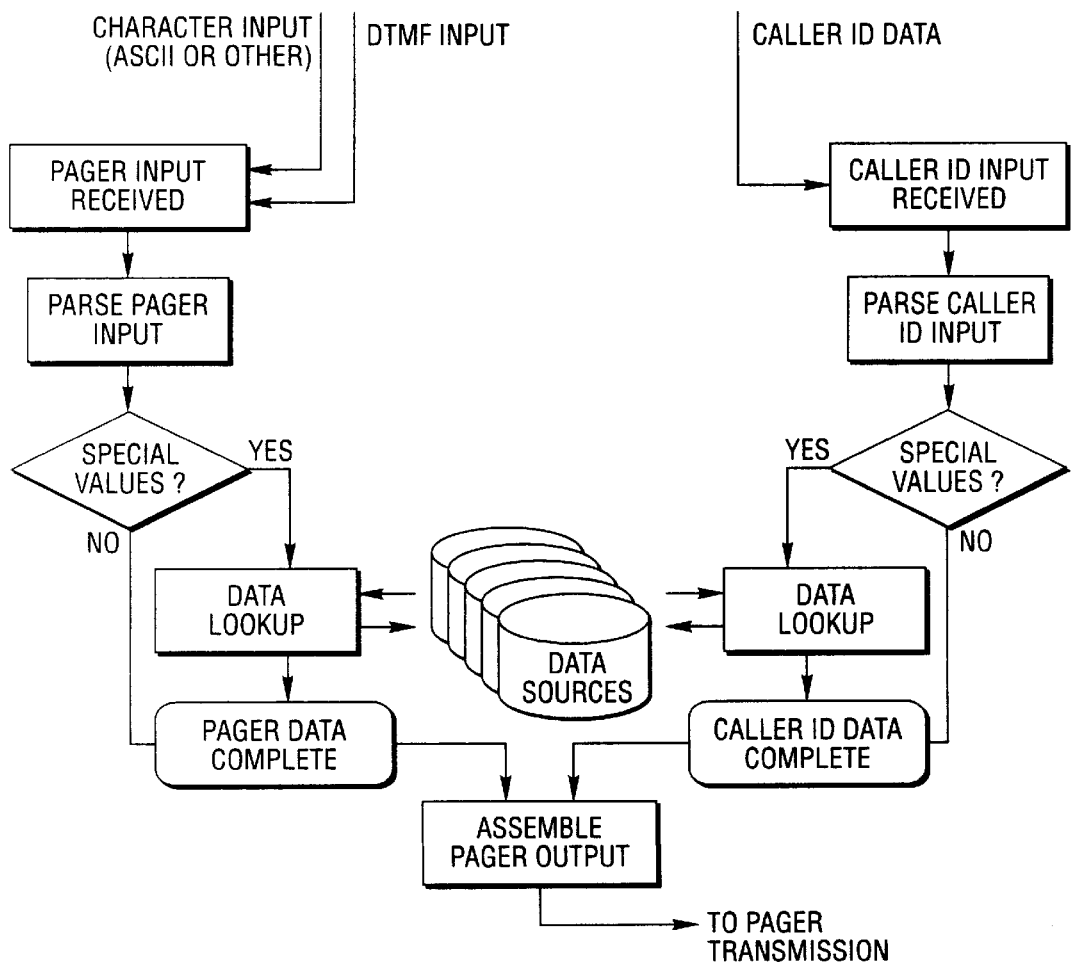
FIG. 6 shows for the paging processor the internal data flow for telephony originated input.
Figure 7:
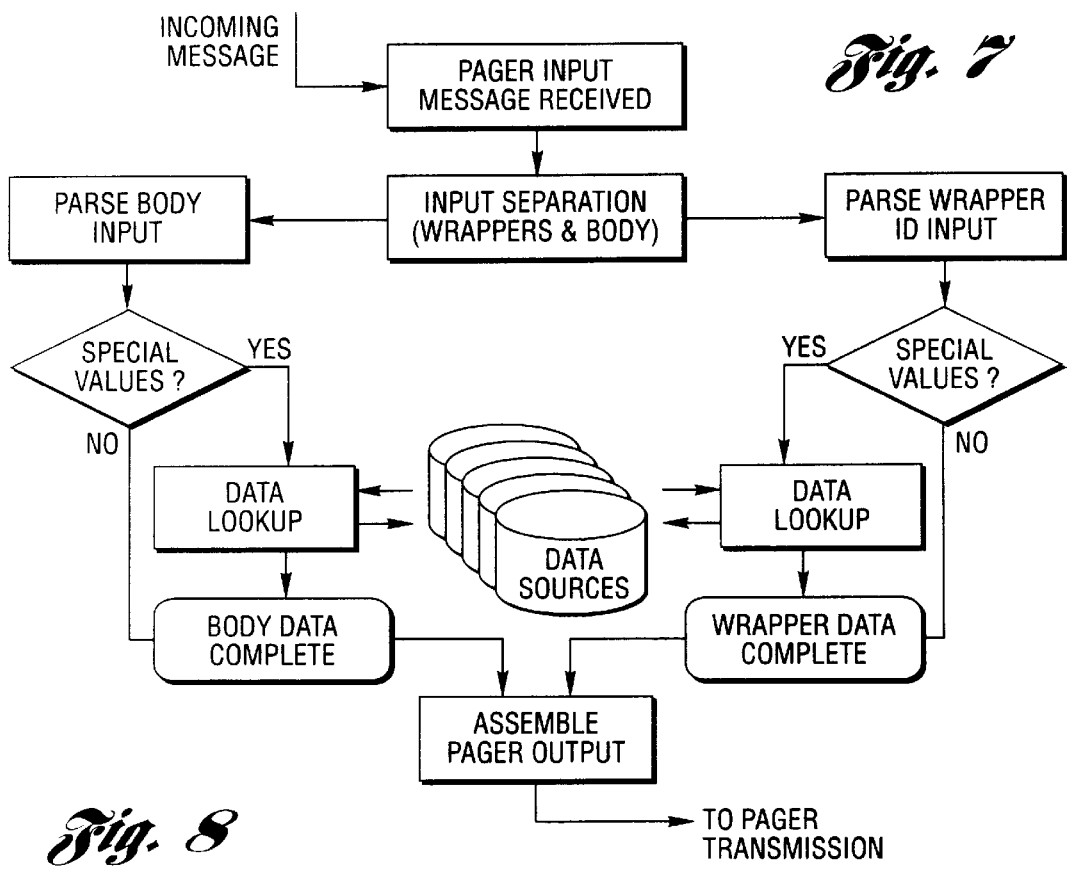
FIG. 7 shows for the paging processor the internal data flow for computer-originated input.

Referring now to FIG. 6 of the drawings, there is shown an internal data flow for telephony input. A similar internal data flow is shown in FIG. 7 in relation to computer-generated input.

Figure 8:
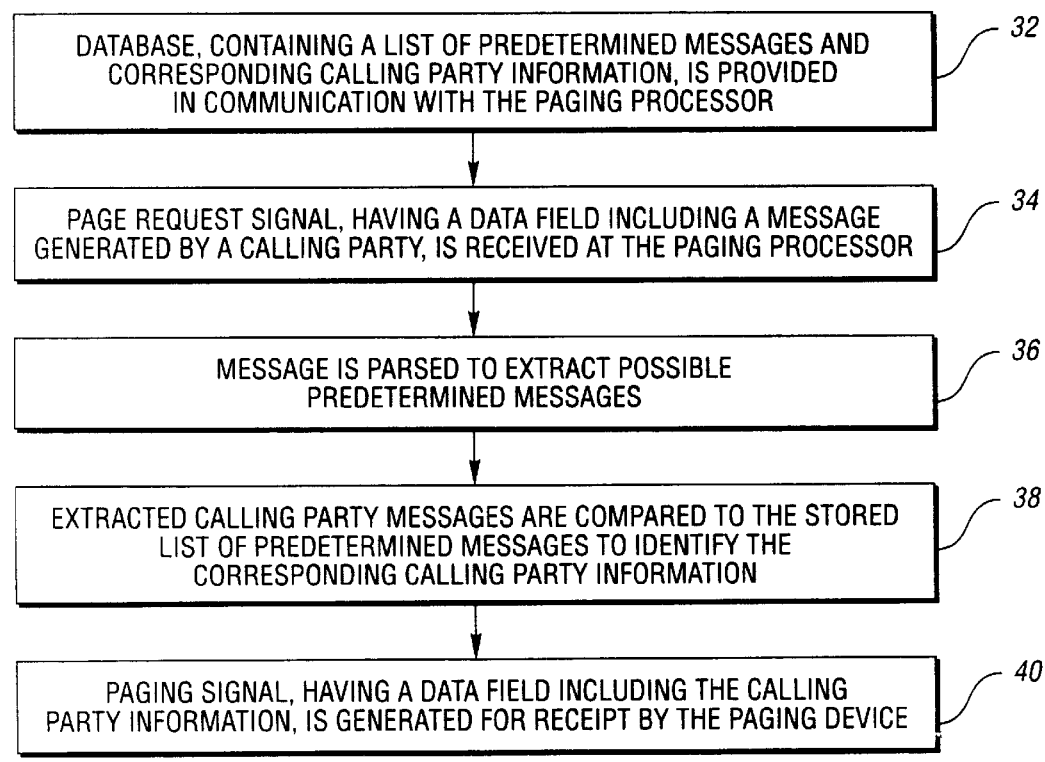
FIG. 8 illustrates the generalized method steps of the present invention.

Finally, with reference to FIG. 8 of the drawings, there is shown a block diagram of the generalized method steps of the present invention as applied to a paging system. As indicated above, the method is specifically directed for use in a communications network having a messaging processor serving at least one paging device. The method is operative to identify and transmit predetermined calling party information such as, for example, calling party names as part of a paging signal.

The method includes providing 32 at least one database in communication with the paging processor. The at least one database includes a list of predetermined messages and corresponding calling party information. In a preferred embodiment, the predetermined messages comprise calling party telephone numbers and the corresponding calling information comprises calling party names. The method further includes receiving 34 at the paging processor a page request signal having a data field including a message generated by a calling party. The message is parsed 36 to extract possible predetermined messages such as, for example, calling party telephone numbers. Thereafter, the extracted calling party messages which are typically, but not necessarily, calling party telephone numbers are compared 38 to the stored list of predetermined messages to identify the corresponding calling party information. Again, the predetermined messages are typically, but not necessarily, telephone numbers and the calling party information is typically, but not necessarily, the name of the calling party.

Finally, a paging signal is generated 40 for receipt by the at least one paging device. The paging signal has a data field including the calling party information.

While the best modes for carrying out the invention have been described in detail, those familiar with the art to which this invention relates will recognize various alternative designs and embodiments for practicing the invention as defined by the following claims.

What is claimed is:

1. For use in a communications network having a paging processor serving at least one paging device and at least one calling party, a method of identifying and transmitting calling party information as part of a paging signal, comprising:

providing at least one database in communication with the paging processor, the at least one database and the paging processor servicing the communications network, the at least one database having a profile for each calling party, each profile including the corresponding calling party's telephone number, a list of predetermined messages and associated message codes, and corresponding calling party information;

receiving at the paging processor a page request signal having data fields including a calling party telephone number and a message including at least one message code generated by the calling party;

parsing the page request signal at the paging processor to extract the calling party's telephone number and the at least one message code from the paging request signal;

comparing at the paging processor the extracted at least one message code to the stored list of predetermined messages and associated message codes provided in the at least one database for the corresponding profile to identify the corresponding calling party information and the corresponding at least one predetermined message; and generating a paging signal at the paging processor for receipt by the at least one paging device, the paging signal having a data field including the calling party information and including the at least one predetermined message.

2. A method as in claim 1, wherein the message generated by the calling party is a text message including at least one message code that is extracted during parsing.

3. A method as in claim 1, wherein the message generated by the calling party is a voice message including at least one message code that is extract during parsing.

* * * * *